US 12,024,240 B2

(12) United States Patent
Bayer et al.

(10) Patent No.: US 12,024,240 B2
(45) Date of Patent: Jul. 2, 2024

(54) STEERING COLUMN AND STEER-BY-WIRE STEERING SYSTEM

(71) Applicants: thyssenkrupp Presta AG, Eschen (LI); thyssenkrupp AG, Essen (DE)

(72) Inventors: Tim Bayer, Lüchingen (CH); Simon Blaettler, Grabs (CH); Thomas Werner Heitz, Mauren (LI); Daniel Kreutz, Feldkirch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 699 days.

(21) Appl. No.: 17/271,040

(22) PCT Filed: Sep. 10, 2019

(86) PCT No.: PCT/EP2019/074021
§ 371 (c)(1),
(2) Date: Feb. 24, 2021

(87) PCT Pub. No.: WO2020/058025
PCT Pub. Date: Mar. 26, 2020

(65) Prior Publication Data
US 2021/0188342 A1    Jun. 24, 2021

(30) Foreign Application Priority Data
Sep. 17, 2018   (DE) .................... 10 2018 122 767.1

(51) Int. Cl.
*B62D 5/00*      (2006.01)
*B62D 1/181*    (2006.01)
(Continued)

(52) U.S. Cl.
CPC ............. *B62D 5/006* (2013.01); *B62D 1/181* (2013.01); *B62D 1/185* (2013.01); *F16H 1/22* (2013.01); *F16H 7/02* (2013.01)

(58) Field of Classification Search
CPC ......... B62D 5/006; B62D 1/181; B62D 1/185
See application file for complete search history.

(56) References Cited

U.S. PATENT DOCUMENTS 2,769,351 A      11/1956  Serfling et al.
4,598,604 A *   7/1986   Sorsche ................. B62D 1/181
                                                                  74/425

(Continued)

FOREIGN PATENT DOCUMENTS

CN    104968554 A    10/2015
CN    108001523 A    5/2018
(Continued)

OTHER PUBLICATIONS

English Translation of International Search Report issued in PCT/EP2019/074021, dated Dec. 4, 2019.

*Primary Examiner* — Kevin Hurley
*Assistant Examiner* — Hosam Shabara
(74) *Attorney, Agent, or Firm* — thyssenkrupp North America, LLC

(57) ABSTRACT

A steering column for a steer-by-wire steering system may include a steering shaft that can be connected to a steering wheel. The steering shaft is rotatably mounted about a longitudinal axis in a casing unit. A feedback actuator may be operatively coupled to the steering shaft. The casing unit may have a second length in a direction of the longitudinal axis, and the steering shaft may project into the casing unit by a first length. Consequently, installation space volume and weight are saved, particularly where the first length is less than the second length. In some cases, the first length is less than or equal to half of the second length.

12 Claims, 8 Drawing Sheets

(51) Int. Cl.
  *B62D 1/185* (2006.01)
  *F16H 1/22* (2006.01)
  *F16H 7/02* (2006.01)

(56) References Cited

U.S. PATENT DOCUMENTS

| | | | | |
|---|---|---|---|---|
| 6,820,713 | B2* | 11/2004 | Menjak | B62D 5/006 |
| | | | | 180/402 |
| 9,421,994 | B2* | 8/2016 | Agbor | B62D 1/19 |
| 10,633,013 | B2* | 4/2020 | Kreutz | B62D 5/001 |
| 11,591,001 | B2* | 2/2023 | Siklodi | B62D 1/187 |
| 11,679,798 | B2* | 6/2023 | Kreutz | B62D 1/181 |
| | | | | 280/775 |
| 2003/0209381 | A1 | 11/2003 | Menjak | |
| 2015/0375767 | A1 | 12/2015 | Agbor et al. | |
| 2018/0154925 | A1 | 6/2018 | Steinkogler | |
| 2018/0319419 | A1 | 11/2018 | Kreutz | |
| 2018/0319422 | A1 | 11/2018 | Polmans et al. | |
| 2019/0017539 | A1* | 1/2019 | Cymbal | B62D 1/20 |
| 2019/0118853 | A1 | 4/2019 | Delmarco et al. | |
| 2019/0283792 | A1* | 9/2019 | Suzuki | B62D 1/184 |
| 2021/0269083 | A1* | 9/2021 | Hikida | F16H 1/22 |

FOREIGN PATENT DOCUMENTS

| | | | |
|---|---|---|---|
| CN | 108290601 A | 7/2018 | |
| CN | 108290602 A | 7/2018 | |
| DE | 100 57 950 A | 5/2002 | |
| DE | 10 2015 007 280 A | 12/2016 | |
| DE | 10 2015 210 528 A | 12/2016 | |
| DE | 10 2015 224 602 A | 6/2017 | |
| EP | 2175167 A1 | 4/2010 | |
| JP | 60018450 A * | 1/1985 | ............ B62D 1/181 |
| WO | 2016/198328 A | 12/2016 | |
| WO | 2017/009125 A | 1/2017 | |
| WO | 2017/097662 A | 6/2017 | |
| WO | WO-2017097662 A1 * | 6/2017 | ............ B62D 1/181 |
| WO | 2020/043233 A1 | 3/2020 | |

* cited by examiner

STEERING COLUMN AND STEER-BY-WIRE STEERING SYSTEM

CROSS REFERENCE TO RELATED APPLICATIONS

This application is a U.S. National Stage Entry of International Patent Application Serial Number PCT/EP2019/074021, filed Sep. 10, 2019, which claims priority to German Patent Application No. DE 10 2018 122 767.1, filed Sep. 17, 2018, the entire contents of both of which are incorporated herein by reference.

FIELD

The present disclosure generally relates to steering columns and steer-by-wire steering systems for motor vehicles.

BACKGROUND

In steer-by-wire steering systems, in contrast to conventional steering systems, a mechanical forced coupling between a steering wheel and a steering gear is eliminated. The steering movement, introduced by a vehicle driver into the steering wheel, is detected in steer-by-wire steering systems by a sensor, immediately processed by a controller and finally converted by an actuating drive as a function of a corresponding control signal into a steering angle of a steered wheel. By means of a feedback actuator, a force and thus a steering torque is applied to the steering wheel in order to simulate the actuating forces and reaction forces required for safe driving in the sense of conventional steering.

The aforementioned steer-by-wire steering system typically comprises a steering column of the type mentioned in the introduction which is known in a plurality of embodiments. In this case, generally steering columns in which a steering shaft is rotatably mounted in a casing tube are common. The casing tube is itself axially adjustably mounted, in particular the casing tube may be axially adjustably mounted in a second, also axially adjustably mounted and so-called intermediate, casing tube, according to which the aforementioned casing tubes are mounted in a telescopably axially adjustable manner relative to a so-called outer casing tube, wherein the outer casing tube is pivotably mounted on a bracket which may be fastened on the vehicle side in order to permit a height adjustment of the steering shaft. For the described axial adjustment and the described height adjustment, typically a motor-operated actuating drive is provided, in particular in each case a spindle drive.

In an assembled state of the steering column of the type mentioned in the introduction, the steering shaft, in particular when it is designed as a steering shaft, may be operated by a vehicle driver as in a conventional steering system, i.e. a steering system in which the steering shaft is mechanically coupled to a vehicle steering system, i.e. a coupling between the track rods and the steering shaft, wherein the component in this case is preferably designed as an inner casing tube and the steering shaft is preferably designed as a steering shaft so that, in an assembled state, the steering shaft is arranged continuously in the casing tube in the axial direction.

The steering shaft in this case is designed, in particular, such that it may be coupled to a feedback actuator on a portion spaced apart from the vehicle driver. The feedback actuator in this case may have a drive means, in particular an electric motor, the steering shaft being driven thereby via a transmission element so that corresponding reaction forces and actuating forces are provided on the steering shaft.

A steering column of the type mentioned in the introduction is disclosed, for example, in DE 10 2015 007 280 A1. In this case a steering shaft is connected to a manual torque adjuster, wherein the steering shaft is rotatably mounted in a casing tube.

A steering device comprising a feedback actuator is disclosed in DE 10 2015 210 528 A1.

In CN 10 800 1523 A, a gearing for the automatic control of a steering shaft is disclosed, wherein the gearing is designed as a belt drive.

A drawback of the prior art, however, is that the aforementioned steering column typically has a high mass and that a steering column of the aforementioned type takes up a relatively large installation space volume.

Thus a need exists for a steering column for a motor vehicle which has a compact, space-saving construction and at the same time has a low mass.

DETAILED DESCRIPTION

Figure 1:
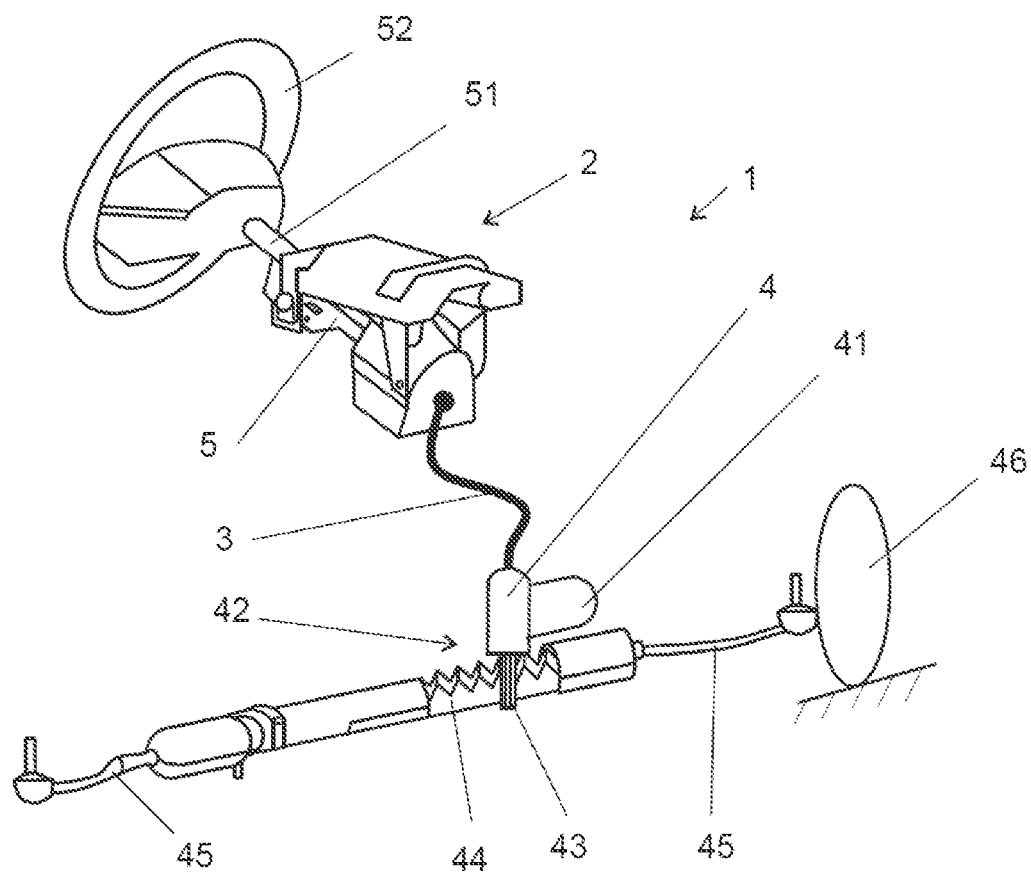
FIG. 1 is a schematic view of an example steer-by-wire steering system with a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for steer-by-wire steering systems of motor vehicles. In some examples, a steering column may include a steering shaft that can be connected to a steering wheel, which steering shaft is rotatably mounted about a longitudinal axis in a casing unit. A feedback actuator may be operatively coupled to the steering shaft, and the casing unit may have a length L2 in a direction of the longitudinal axis. The steering shaft may project into the casing unit by a length L1. The present disclosure further relates to steer-by-wire steering systems.

In some example steering columns the length L1 is less than the length L2. In other words, the steering shaft in the axial direction is shorter than the casing tube in the axial direction. Thus the steering shaft projects into the casing unit, wherein an end of the steering shaft is arranged between the ends of the casing unit in the axial direction. The other end of the steering shaft, which is not arranged between the ends of the casing unit, may be arranged outside the casing unit.

The steering shaft projects into the casing unit, in other words the steering shaft extends into the casing unit along the longitudinal axis in the casing unit.

The axial direction is equivalent to the direction of the longitudinal axis.

Preferably, the casing unit may comprise a casing tube. The casing tube may be configured, for example, as an integral component.

Moreover, in a preferred embodiment, the casing unit may be received in an axially fixed outer casing tube relative to a vehicle chassis. It is also conceivable and possible that at least one further intermediate casing tube which is axially movably mounted relative to the outer casing tube is provided, wherein the casing unit is axially displaceably received in the intermediate casing tube.

The casing unit has an internal diameter relative to a hollow space radially enclosed thereby. The hollow space, for example, is cylindrical or at least substantially cylindrical. The casing unit preferably has a bearing portion in and/or on which the steering shaft is rotatably mounted. Preferably a bearing, preferably a plain bearing or a rolling bearing, is received in the casing unit, the steering shaft being rotatably mounted therein.

The casing unit is preferably connectable to the vehicle directly or indirectly, in particular via a bracket. Preferably, the casing unit is configured as a casing tube or has such a casing tube, wherein the casing unit is particularly preferably displaceably received in an outer casing, also denoted as the outer casing tube.

The length L1 is preferably a length in the axial direction by which the steering shaft projects into the casing unit. L2 is preferably the maximum axial length of the casing unit. Preferably, L1 and L2 are definable in parallel directions. Preferably, L2 corresponds to the shortest distance from a first end of the casing unit to a second end of the casing unit. Preferably, the first and the second end of the casing unit are defined in each case by front faces of the casing unit, in particular front faces of a casing tube.

Preferably, L1 corresponds to a partial distance of a total distance of the steering shaft which extends from a first end of the steering shaft to a second end of the steering shaft. Preferably the first and the second ends of the steering shaft are defined in each case by front faces of the steering shaft. Preferably the right-angled projections of L1 and L2 coincide.

Preferably the casing unit is designed as an inner casing tube which is displaceably received in an outer casing tube encompassed by the steering column according to the invention. Particularly preferably an intermediate casing tube, which is also encompassed by the steering column according to the invention, is arranged between the inner casing tube and the outer casing tube, so that according to this measure, in particular, an axially telescopable casing tube arrangement is provided, wherein particularly advantageously a correspondingly telescopable design of the steering shaft may be avoided by the teaching according to the invention. In this case it is advantageous, in particular, if the steering column according to the invention is adjustable, in particular by means of a motorized drive, in particular relative to an axial displacement of the casing tube and/or a pivotable displacement of the casing tube relative to a bracket unit, on and/or in which the casing tube is pivotably mounted. Advantageously, the steering column according to the invention is able to be produced by these measures in a manner which is cost-effective and saves weight.

As the length L1 is less than the length L2, the installation space volume and the mass of the steering column according to the invention is reduced. The steering shaft projects only into a relatively small portion of the casing unit, according to which the mass and installation volume may be saved by a correspondingly short steering shaft. Moreover, the freedom of design is enhanced, for example, by the feedback actuator being able to be mounted along the steering column, depending on the length of the steering shaft. A further advantage is that, relative to the prior art, the feedback actuator is able to be mounted significantly more closely on a steering wheel which is operatively connected to the steering shaft. From the perspective of a telescopable steering column, i.e. for example a steering column in which, for example, an inner casing tube is axially displaceably mounted in an intermediate casing tube, wherein the intermediate casing tube is axially displaceably mounted in an outer casing tube, it is advantageously avoided by the teaching according to the invention that the steering shaft is composed of a plurality of elements which are axially displaceable relative to one another, which would also have to be able to be telescopably pulled apart and brought together again in the sense of the aforementioned casing tubes. In particular, "dimension" is understood as an outer dimension of the casing unit and the steering shaft. "Dimension" is understood, in particular, as a maximum outer dimension of the component and the steering shaft. The "axis of movement" is understood, in particular, as an imaginary rotational axis of the steering shaft, i.e. in particular the longitudinal axis of the steering shaft.

According to an advantageous embodiment of the steering column according to the invention, the length L1 is less than or equal to half of the length L2. In particular, the following applies accordingly, for example $L1=0.5 \cdot L2$, $L1=0.4 \cdot L2$, $L1=0.3 \cdot L2$, $L1=0.2 \cdot L2$ or $L1=0.1 \cdot L2$. This measure leads to an even further reduction of the installation space volume and the weight.

According to a further advantageous embodiment of the steering column according to the invention, the feedback actuator is designed to provide a steering force to a vehicle driver when operating the steering shaft. According to this measure the feedback actuator serves, in particular, for generating a realistic steering sensation to the vehicle driver during the operation of the steering shaft, since, in particular according to an assembly of the steering column according to the invention in the steer-by-wire steering system, no mechanical coupling is provided between the steering shaft and the wheels of a vehicle and thus the track rods and thus a steering rack for a pivoting movement of the track rods and thus with a pinion in engagement with the steering rack. In this case, in particular, a synergistic effect is produced with the aforementioned inequalities and/or relations between L1 and L2, since, in a mounted state of the steering column in the steer-by-wire steering system, the feedback actuator may be positioned significantly closer to the vehicle driver, relative to steering columns from the prior art, in particular in the vicinity of the interface between the steering shaft and a steering wheel which is operatively connected or is designed to be connectable to the steering shaft. By this measure, advantageously the installation space volume of the steering column is even further reduced and the freedom of design relative to the layout of the steering column and thus of the steer-by-wire steering system is further enhanced.

In a further advantageous embodiment of the steering column according to the invention, the feedback actuator has a drive means for driving the steering shaft, wherein, in an assembled state of the steering column, the drive means is arranged outside the casing unit. The drive means may be, for example, an electric motor which, in particular, has an output shaft so that, by a transmission of a torque onto the steering shaft, which may be assigned to the output shaft, depending on the determined interaction, in particular between the wheels of the steer-by-wire steering system and a road, and/or further vehicle states, such as for example a vehicle speed, in particular a cornering speed, and an adjustment angle of the aforementioned wheels and/or the track rods and/or a steering rack and/or a torque applied to a further steering shaft and/or a deformation state of a further component of the steering column, the steering column is correspondingly driven so that, in particular, a steering movement applied by the vehicle driver is superimposed by a further steering movement applied by the drive means, in the direction of the steering movement applied by the vehicle driver or in a correspondingly opposing direction.

In this case, in an assembled state of the steering column according to the invention, the drive means, in particular when it is designed as an electric motor, is arranged outside the casing unit, wherein the casing unit in particular may be a casing tube in which the steering shaft is rotatably mounted.

According to a further advantageous embodiment of the steering column according to the invention, the feedback actuator comprises a gearing for operatively connecting the drive means to the steering shaft. Accordingly, in a particularly advantageous manner, a torque which is provided, for example, by the drive means may be converted, in particular, into a second torque for simulating a realistic driving sensation which is then applied to the steering shaft. Moreover, in a particularly advantageous manner, the aforementioned torque of the drive means may be transmitted in the case of a spaced-apart arrangement between the steering shaft and the drive means, in particular when the drive means, in a driven state, is arranged outside the casing unit, in particular when the casing unit is designed as a casing tube and the steering shaft is rotatably mounted in the casing unit.

In a further advantageous embodiment of the steering column according to the invention, the gearing is designed as a pulley drive. According to this measure, the pulley drive is designed, in particular, as a belt drive, for example with a first pulley fastened to the aforementioned output shaft, a second pulley mounted on the steering shaft and a belt wrapped around the first and the second pulley, in particular a toothed belt or a flat belt or a V-belt, wherein the first and the second pulley are configured so as to correspond to the geometry of the belt. Advantageously, by a relatively simple measure, the steering shaft may be accordingly driven whilst saving installation space volume.

In a further advantageous embodiment of the steering column according to the invention, the gearing is designed as a toothed gearing. It is advantageous that a particularly accurate transmission of a torque provided by the drive means, in particular when it is designed as an electric motor, to the steering shaft may be implemented by these measures.

A toothed gearing in this case is a single-stage or multistage spur gear unit, wherein, in the case of a single-stage gearing, a first gearwheel is fastened to the output shaft of the electric motor and a second gearwheel is fastened to the steering shaft, wherein the first gearwheel is in meshing engagement with the second gearwheel. Preferably, straight teeth or helical teeth may be used.

In a further advantageous embodiment of the steering column according to the invention, the casing unit has at least one recess, wherein the steering shaft is accessible via the recess to a transmission element of the gearing. The recess may have, in particular when the casing unit has a hollow space, in particular one or more slot-shaped openings, through which the transmission element, i.e. for example a belt or a gearwheel of the corresponding gearing, projects into the casing tube such that the steering shaft mounted in the casing tube may be driven by the drive means via the transmission element. It is advantageous that the drive means, in particular when it is designed as an electric motor with an output shaft, may be brought into an operative connection at virtually any point of the steering column for driving the steering shaft, and namely in particular relative to the casing unit, in particular when it is designed as a casing tube. Thus the casing unit may be designed to be more compact, such that the drive means is arranged outside the casing unit and thus the casing unit does not serve as a housing for the drive means. Thus, due to this measure, the mass and the installation space of the steering column may be further reduced.

In a further advantageous embodiment, the steering shaft is configured in at least one portion as a solid shaft. This is advantageous relative to cost savings since a solid shaft and/or a corresponding portion of the steering shaft is a particularly simple measure and solid shafts may be designed to be compact. Moreover, the design as a solid shaft in one portion permits the steering shaft to be advantageously designed for an operative connection with the drive means, in particular by a gear wheel and/or a disk wheel of a belt drive being able to be arranged on the portion of the steering shaft which is designed as a solid shaft, with the assistance of fastening means or measures such as, for example, a tongue and groove connection, a welded connection, a screw connection, a positive connection, in particular by heat shrinkage or by simple pressing. In an advantageous development, the steering shaft and the gearwheel and/or a disk wheel of a belt drive may be configured as a one-piece integral component.

In an alternative advantageous embodiment, the steering shaft is configured as a hollow shaft. Due to this measure, the mass of the steering column may be further reduced.

The object is achieved regarding the steer-by-wire steering system in that it comprises a steering column as claimed in one of the accompanying claims and/or the embodiments disclosed herein, wherein the casing unit has a casing tube and the steering shaft is mounted in the casing tube about a rotational axis and projects into the casing tube. This is advantageous since, according to this measure, a compact and weight-saving steer-by-wire steering system is provided relative to the prior art. The steering shaft projects in this case into the casing tube. In a particularly advantageous manner, in this case the steering column comprises the feedback actuator with the drive means and the gearing, wherein the drive means is designed as an electric motor which is arranged outside the casing tube and wherein the casing tube has at least one recess via which the steering shaft is accessible to the belt of a belt drive or the gearwheel of a toothed gearing, so that the steering shaft is wrapped around by the belt and/or is in engagement with the gearwheel so that the steering shaft is connected by the electric motor for providing steering reaction forces to the vehicle driver.

FIG. 1 shows schematically a steer-by-wire steering system 1 which comprises a steering column 2 which is connected via an electrical line 3 to an electrical steering drive 4. The steering drive 4 comprises an electrical actuating motor 41 which is connected to the electrical steering 3 and which introduces a steering actuating torque into a steering gear 42. Here, the steering actuating torque is converted via a pinion 43 in a steering rack 44 into a translational movement of the track rods 45, whereby a steering angle of the steered wheels 46 is produced. The steering column 2 comprises a steering shaft 51, a steering wheel 52 being attached at the rear end thereof relative to the direction of travel of a vehicle, not shown. The steering column 2 further comprises an outer casing tube 5 in which the steering shaft 51 is axially telescopably and accordingly displaceably mounted in the direction of the longitudinal axis of the steering shaft 1.

Figure 2:
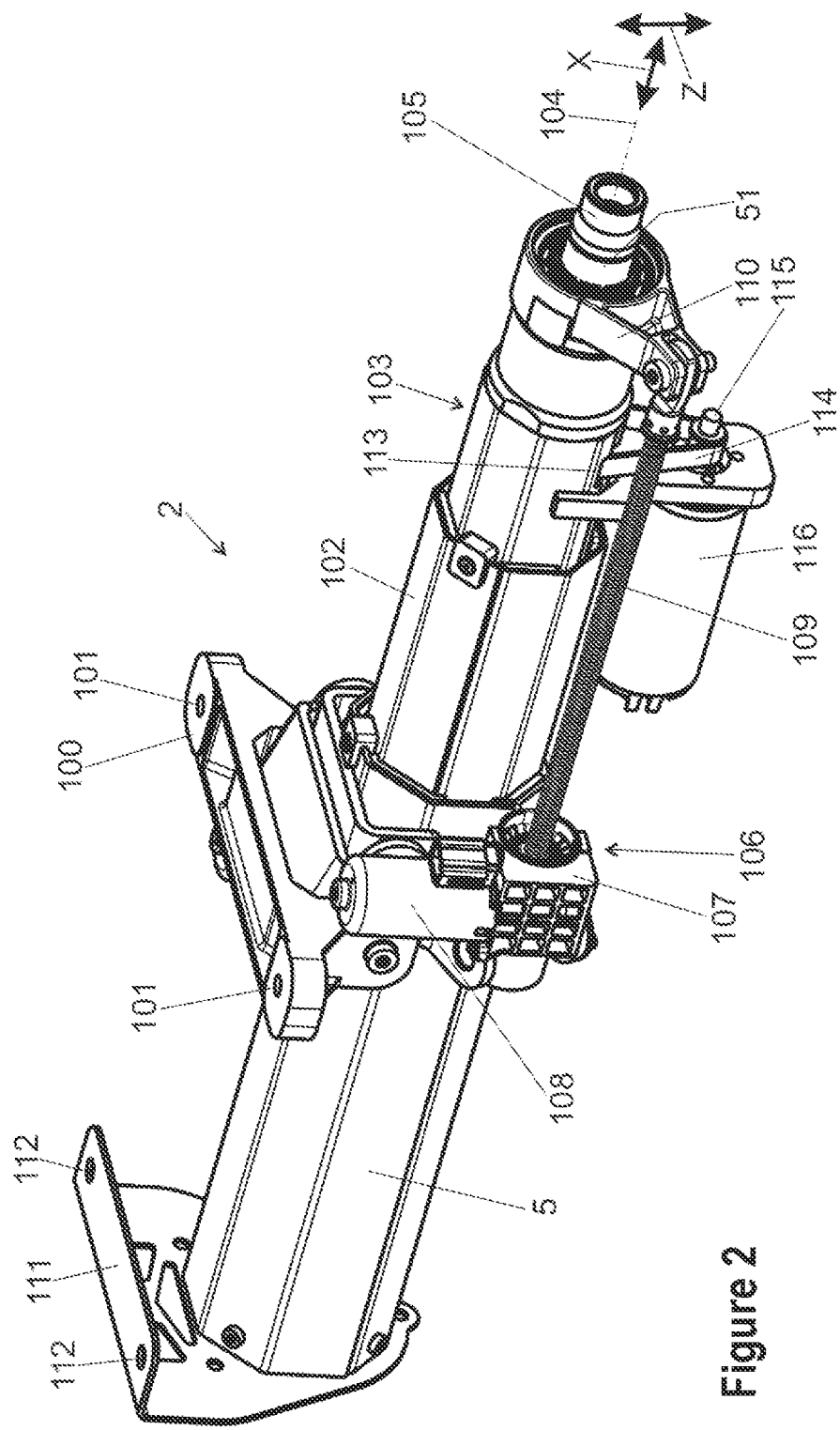
FIG. 2 is a perspective view of the steering column according to FIG. 1.

FIG. 2 shows the steering column 2 in a schematic perspective side view, obliquely from above onto the aforementioned rear end. The steering column 2 comprises a bracket 100, wherein the bracket 100 has fastening means 101 for connecting the bracket 100 and thus the steering column 2 to a vehicle body, not shown. The outer casing tube 5 is held by the bracket 100. An intermediate casing tube 102 is axially displaceably arranged in the outer casing tube 5 in the directions of the double arrow X. In the intermediate casing tube 102, in turn a casing unit 103 configured as an inner casing tube is axially displaceably arranged in the directions of the double arrow X. In the casing unit 103, the steering shaft 51 is rotatably mounted about an imaginary rotational axis 104. The rotational axis 104 corresponds to the longitudinal axis of the steering shaft 51. The steering shaft 51 has a fastening portion 105 for fastening the steering wheel 2, not shown in FIG. 2, according to FIG. 1.

Accordingly the outer casing tube 5, the intermediate casing tube 102 and the casing unit 103 form a casing arrangement with a telescopably arranged outer casing tube 5, intermediate casing tube 102 and casing unit 103, so that the steering shaft 51 is axially displaceable in one of the directions of the double arrow X. The axial displacement of the intermediate casing tube 102, the casing unit 103 and thus the steering shaft 51 is implemented by means of a spindle drive 106. The spindle drive 106 comprises a gear housing 107 in which a spindle nut, not shown in more detail here, is rotatably mounted. The spindle nut is driven by an electric motor 108 by means of a worm gear, not visible in FIG. 2, so that, via an engagement of the threaded spindle 109, also encompassed by the spindle drive 106, this is set into a translational movement in a driven state of the electric motor 108, so that, by means of a fastening 110 of the threaded spindle 109 to the casing unit 103, according to an extended state of the casing unit 103 and/or the steering shaft 51, this is moved with the intermediate casing tube 102 in a translational manner in one of the directions of the double arrow X, according to the drive direction of the spindle nut, not visible here. The outer casing tube 5 has a second bracket 111, wherein the second bracket 111 has fastening means 112 on its plate-shaped portion so that the outer casing tube 105, similar to the bracket 100, may be fastened to a body of the vehicle, not shown here.

The inner casing tube 103 has two slot-shaped recesses 113. A flat belt 114 is guided through the slot-shaped recesses 113 so that the flat belt 114 is wrapped around the steering shaft 51 and an output shaft 115 of an electric motor 116 so that, in a driven state of the electric motor 116, the output shaft 115 is rotatable about the rotational axis 140 when the flat belt 114 is driven by the electric motor 116 so that the steering shaft 51 is correspondingly driven for the simulation of steering and reaction forces, as might typically occur in the case of a steering shaft which is mechanically coupled to the wheels of a vehicle. The electric motor 116, the output shaft 115, the belt 114 and the pulleys 120 which are fastened to the steering shaft 51 and the output shaft 115, around which the belt 114 is wrapped, form a feedback actuator. The feedback actuator may also be regarded as being formed from the electric motor 116, the output shaft 115 and the belt 114. Moreover, the feedback actuator may have a control unit for controlling the electric motor 116 which is electrically coupled to the on-board network of the vehicle. From FIG. 2, it may be seen that the electric motor 116 is arranged outside the inner casing tube 103 and thus also outside the steering shaft 51. Via a second spindle drive, not visible in FIG. 2, the outer casing tube 5 and thus the intermediate casing tube 102 and thus the casing unit 103 and thus the steering shaft 51 are pivotable by a pivoting mechanism which is formed by a correspondingly pivotable connection between the outer casing tube 5 and the bracket 100, such that the aforementioned components are movable in the directions of the double arrow Z.

From FIG. 2, it is also visible that the electric motor 116 is fastened fixedly in terms of rotation via a mounting element 304 to the casing unit 103.

Figure 3:
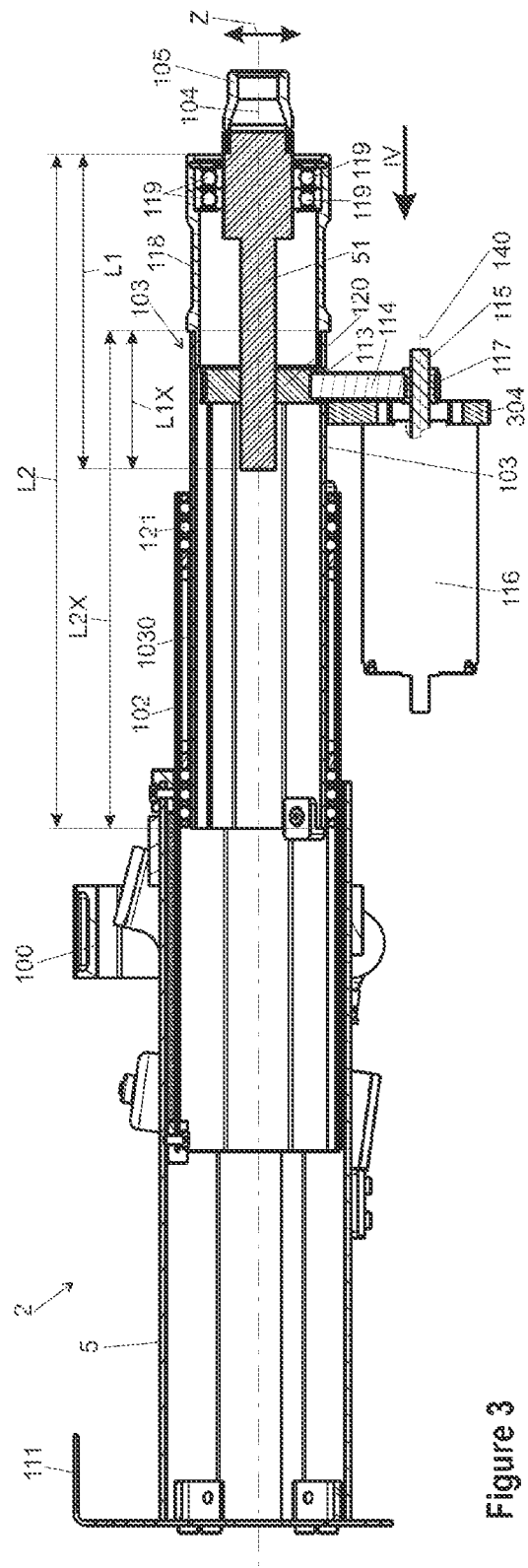
FIG. 3 is a longitudinal sectional view of the steering column according to FIG. 1.

FIG. 3 shows the steering column 2 according to the invention in a longitudinal section along the rotational axis 104. In FIG. 3, it is particularly clearly visible that the steering shaft 51 is shorter in the direction of the rotational axis 104 than the casing unit 103 configured as an intermediate casing tube, so that, in this manner, a compact and thus weight-saving steering column 2 is provided for a steer-by-wire steering system of a motor vehicle. From FIG. 3, it is also visible that, in this embodiment, the casing unit 103 has a tube 1030 and a bearing sleeve 118 which are connected together and form the casing unit 103, wherein the steering column 51 is rotatably mounted in the bearing sleeve 118 of the casing unit 103 by rolling bearings 119 about the rotational axis 104 in the casing unit 103. At this point, it is expressly pointed out that the bearing sleeve 118 and the tube 1030 form a one-piece component in order to provide the casing unit 103. The bearing sleeve 118 and the tube 1030 may also be configured as a one-piece integral component for forming the casing unit 103. From FIG. 3, it is also particularly clearly visible that a pulley 120, which is wrapped around by the belt 114, is mounted on the steering shaft 51 in a torque-locking manner, and that a pulley 117, which is also wrapped around by the belt 114, is mounted on the output shaft 115, so that, due to its rotatable mounting provided by the rolling bearings 119, the steering shaft 51 is rotatably drivable relative to the inner casing tube 103 when the output shaft 115 and thus the pulley 117 are driven by the electric motor 108.

The rolling bearings 119 are preferably configured such that they are able to receive a tilting moment. For example, this may be achieved by two angular contact ball bearings which are arranged either in an X-arrangement or in an O-arrangement. Alternatively, an X bearing may be used.

In an alternative embodiment, not shown, it may be provided that two spaced-apart bearings, preferably rolling bearings or plain bearings, bear the steering shaft, wherein the pulley and/or a further gear member such as a gear wheel is arranged between the bearings. In such a case, preferably radial deep groove ball bearings or angular contact ball bearings may be used. Alternatively, rolling bearings may also be used.

From FIG. 3, it is also visible that the casing unit 103 is mounted in the intermediate casing tube 102 by a rolling bearing arrangement 121 for performing the described adjusting movement in one of the directions of the double arrow X. The corresponding rolling bodies are in this case balls or cylinders. Alternatively, however, a plain bearing arrangement may also be provided between the intermediate casing tube 102 and the casing unit 103.

From FIG. 3, it is also visible that the steering shaft 51 projects by a length L1 into the casing unit 103. From FIG. 3, it is also visible that the casing unit 103 has a length L2, wherein the length L1 is less than the length L2.

From FIG. 3, it is also clearly visible that the steering shaft 51 also projects by a length L1X, shortened by the length of the bearing sleeve 118, into the tube 1030, wherein the tube 1030 has a length L2X, wherein the length L1X is less than the length L2X.

Figure 4:
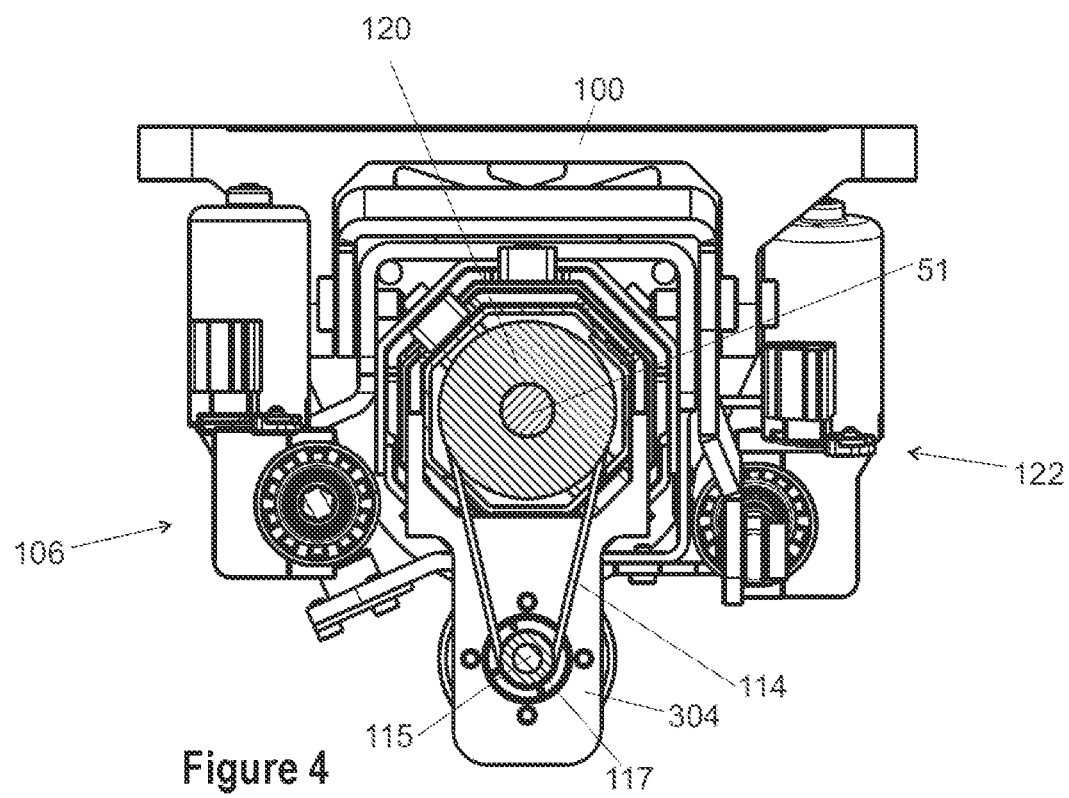
FIG. 4 is a cross sectional view of the steering column according to FIG. 1 with a viewing direction along the arrow IV of FIG. 3.

FIG. 4 shows the steering column 2 in a cross section with a viewing direction along the arrow IV of FIG. 3. From FIG. 4, it is particularly clearly visible how the belt 114 is wrapped around the pulley 120 for driving the steering shaft 51 and how this belt is also wrapped around the pulley 117 which is located on the output shaft 115 in a mounted state. Also visible from FIG. 4 is an actuating drive 122 which is provided for the above-described height adjustment of the aforementioned casing tubes 5, 102, 103, wherein this actuating drive provides a corresponding driving movement similar to the spindle drive 106.

Figure 5:
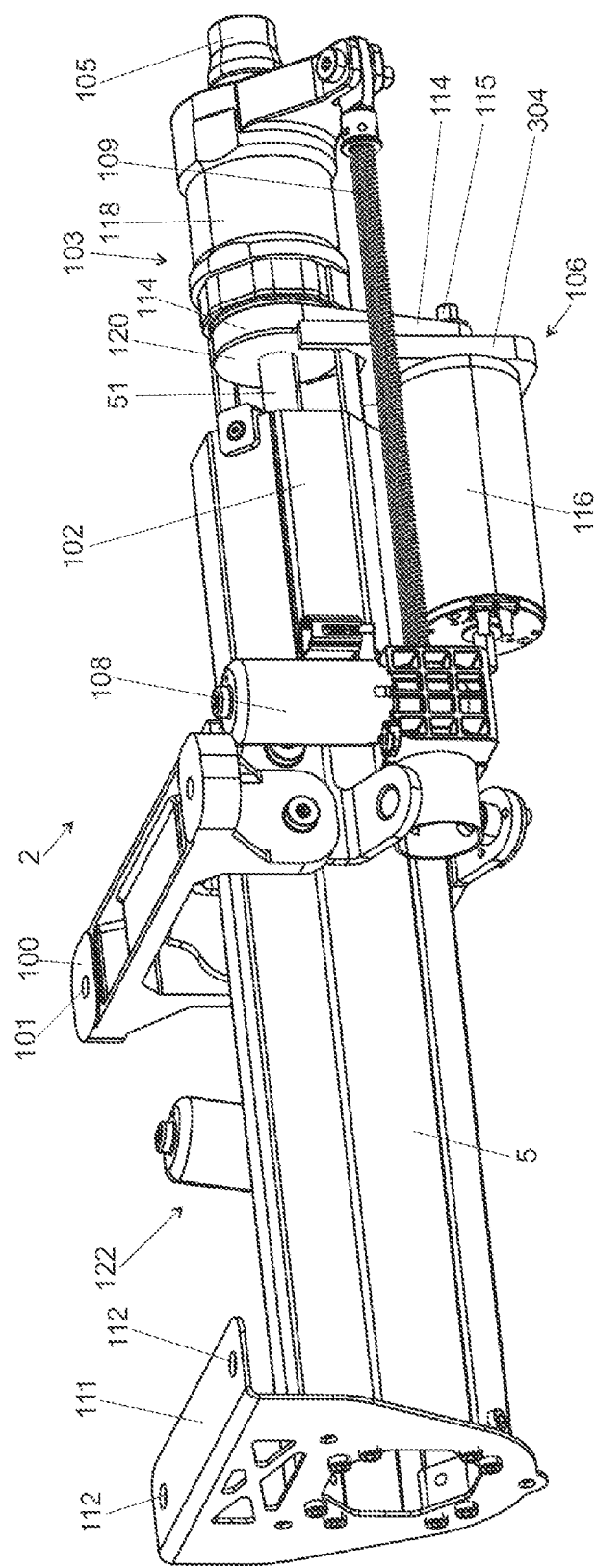
FIG. 5 is another perspective view of the example steering column according to FIG. 1.

FIG. 5 shows the steering column 2 in a further perspective view, obliquely from above. The steering column is shown here in a partially broken-away view and namely in the region of the pulley 102. The tube 1030 of the casing unit 103 is shown here broken away so that the pulley 120 and the corresponding belt drive are visible in perspective.

Figure 6:
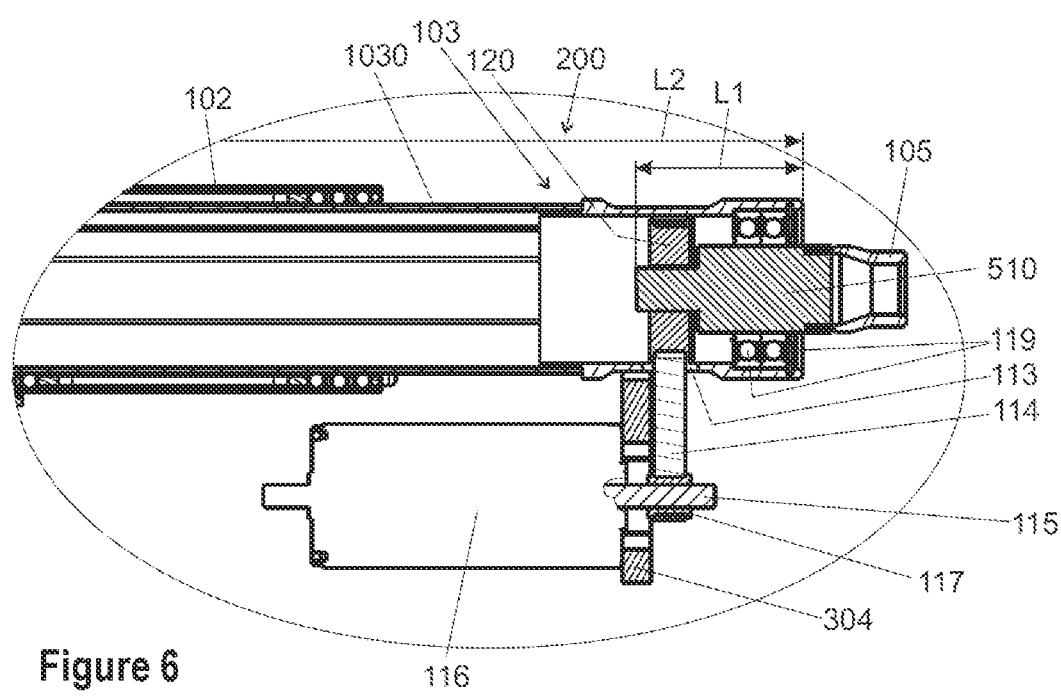
FIG. 6 is a longitudinal sectional view of a portion of another example steering column.

From FIG. 6, it is also visible that the steering shaft 510 projects by a length L1 into the casing unit 103.

FIG. 6 shows a portion of a steering column 200 according to the invention according to a second embodiment, in a sectional view similar to that of FIG. 3. The steering column 200 is designed to be similar to the steering column 2, except for the steering shaft 510 and the arrangement of the electric motor 116, the output shaft 115 and the pulleys 117 and 120. From FIG. 6, it is visible that the steering shaft 510 is designed to be even shorter than the steering shaft 51 so that, accordingly, the illustrated drive of the steering shaft 510 is arranged even closer to the fastening portion 105. The steering shaft 510 projects, therefore, by a length L1 into the casing unit 103, wherein the length L1 is less than the length L2 of the casing unit 103. This is advantageous since, as a result, the steering column 200 is designed to be even more lightweight.

Figure 7:
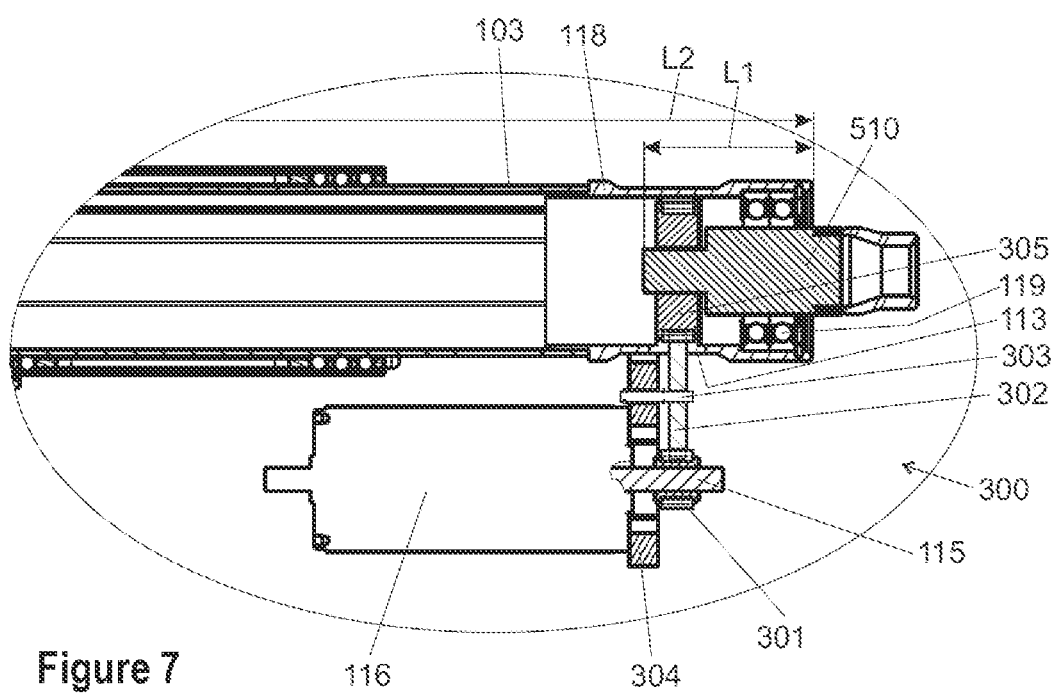
FIG. 7 is a longitudinal sectional view of a portion of still another example steering column.

FIG. 7 shows a portion of a steering column 300 according to the invention according to a third embodiment in a view similar to FIG. 3 or 6, wherein the steering column 300 is designed to be similar to the steering column 200 except that, instead of the belt drive described relative to FIG. 6, the output shaft 115 of the electric motor 116 has a spur gear 301 which is in meshing engagement with a spur gear 302, which is rotatably mounted via an axle 303 in a rotatable manner on the mounting element 304, the electric motor 116 also being mounted thereon, wherein the mounting element 304 is operatively connected to the bearing sleeve 118 of the casing unit 103. The spur gear 303 in turn is in meshing engagement with a spur gear 305 which is arranged on the steering shaft 510, so that a toothed gearing is provided, wherein the spur gear 303 projects into the opening 113 in order to form the described engagement with the spur gear 305. In this manner, an alternative drive of the steering shaft 510 and thus also of the steering shaft 51 is provided, so that, in an operative state of the electric motor 116, the output shaft 115 and thus the spur gear 310 arranged thereon are driven, which in turn drives the spur gear 300, which in turn drives the spur gear 305 and thus the steering shaft 510 so that, with a corresponding control of the electric motor 116, steering reaction forces are provided on the steering shaft 510 for simulating an interactive state between the wheels and a road. The spur gear 305 as a gear member may also be configured with the steering shaft 510 as a one-piece integral component.

Figure 8:
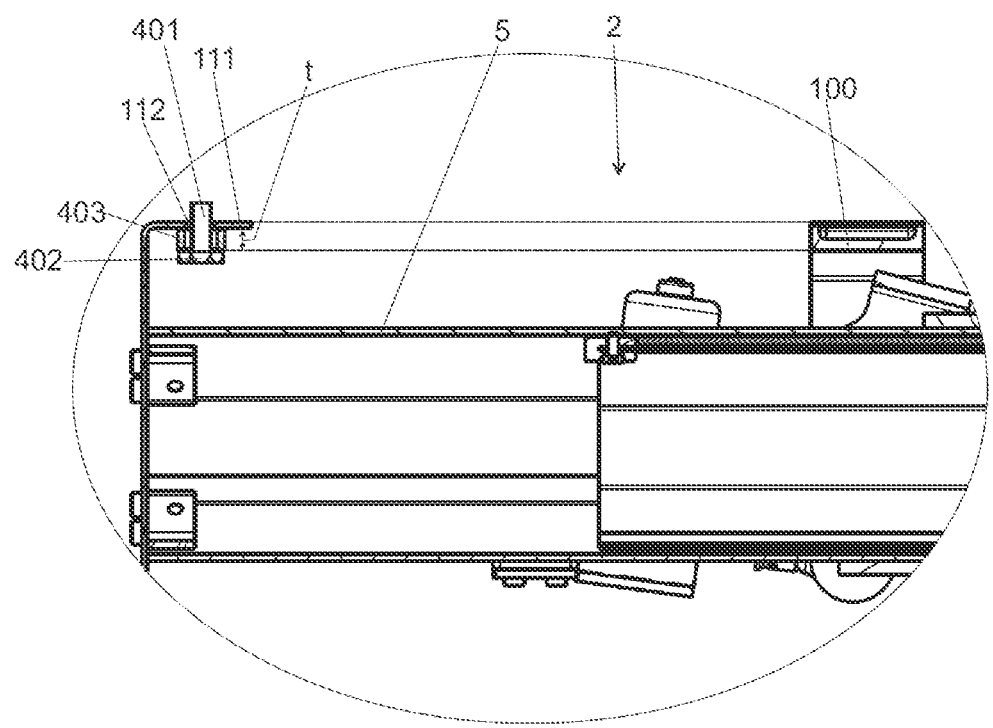
FIG. 8 is a longitudinal sectional view of a portion of yet a further example steering column.

In FIG. 8, a detail of a steering column 2 similar to the steering column of FIG. 3 is shown in a longitudinal section, wherein the outer casing tube 5 has a second bracket 111, wherein the second bracket 111 has fastening means 112 in the form of bores on its plate-shaped portion so that, similar to the bracket 100, the outer casing tube 105 may be fastened to a body of the vehicle, not shown here, by means of screws 401. The second bracket 111 is non-displaceable relative to the vehicle both in normal operation and in the event of a crash. In order to improve the fastening to the vehicle, a sleeve 403 may be arranged between the screw head 402 of the screw 401 and the second bracket 111 which acts as a washer and, when the second bracket 111 is screwed in the vehicle, said sleeve is clamped between the screw head 402 and the second bracket 111. The thickness t of the sleeve 403 is dimensioned such that, depending on its shank length and the depth of a threaded bore, not shown, the screw 401 may be optimally screwed in and the bracket 111 may be fixed to the vehicle, not shown. Preferably, the thickness t of the sleeve 403 is dimensioned such that the thickness of the second bracket 111 and the thickness t of the sleeve 403 correspond to the thickness of the first bracket 100, so that identical screws may be used for fixing the first bracket 100 and the second bracket 111. By this measure, costs may be reduced and incorrect installation avoided. Such sleeves thus serve as a compensation element. It is also conceivable and possible to use such sleeves in different types of steering column, so that identical screws may always be used when fixing the steering column in the vehicle. The sleeve 403 may be formed both from a metal material, such as steel or aluminum, or from a non-metal material. Moreover, the sleeve may have both a circular-cylindrical cross section and a cross section deviating from the circular-cylindrical shape.

The second bracket 111 may preferably be configured as a sheet metal component. However, it is also conceivable and possible that the bracket 111 is formed as a cast component or from a fiber-composite material.

The sleeve 403 may be both loose or attached to the bracket by means of a joining operation prior to assembly in the vehicle. Such a sleeve 403 and the choice of thickness t may also be used in the case of steering columns with a conventional steering shaft which are operatively connected to the steering gear. The use of the sleeve 403 is thus not limited to steering columns for a steer-by-wire steering system. Such sleeves 403 may be used both in manually adjustable steering columns and in electrically adjustable steering columns or in non-adjustable steering columns.

What is claimed is:
1. A steering column for a steer-by-wire steering system of a motor vehicle, the steering column comprising:
 a casing unit;

a steering shaft that is connectable to a steering wheel, wherein the steering shaft is rotatably mounted about a longitudinal axis in the casing unit, wherein the steering shaft projects into the casing unit by a first length; and a feedback actuator operatively coupled to the steering shaft, wherein the casing unit has a second length in a direction of the longitudinal axis, wherein the first length is less than the second length, wherein the feedback actuator includes drive means for driving the steering shaft, wherein in an assembled state of the steering column, the drive means is disposed outside the casing unit and wherein the feedback actuator comprises a gearing for operatively connecting the drive means to the steering shaft and wherein the casing unit includes at least one recess, wherein the steering shaft is accessible via the at least one recess to a transmission element of the gearing.

2. The steering column of claim 1 wherein the first length is less than or equal to half of the second length.

3. The steering column of claim 1 wherein the feedback actuator is configured to provide a steering force to a vehicle driver when operating the steering shaft.

4. The steering column of claim 1 wherein the gearing is configured as a pulley drive.

5. The steering column of claim 1 wherein the gearing is configured as a toothed gearing.

6. The steering column of claim 1 wherein at least one portion of the steering shaft is a solid shaft.

7. A steer-by-wire steering system comprising:
a steering column that includes:
a casing unit;
a steering shaft that is connectable to a steering wheel, wherein the steering shaft is rotatably mounted about a longitudinal axis in the casing unit, wherein the steering shaft projects into the casing unit by a first length; and a feedback actuator operatively coupled to the steering shaft, wherein the casing unit has a second length in a direction of the longitudinal axis, wherein the first length is less than the second length, wherein the feedback actuator includes drive means for driving the steering shaft, wherein in an assembled state of the steering column, the drive means is disposed outside the casing unit wherein the feedback actuator comprises a gearing for operatively connecting the drive means to the steering shaft and wherein the casing unit includes a recess, wherein the steering shaft is accessible via the recess to a transmission element of the gearing, wherein the casing unit has a casing tube, wherein the steering shaft is mounted in the casing tube about a rotational axis and projects into the casing tube.

8. The steer-by-wire steering system of claim 7 wherein the first length is less than or equal to half of the second length.

9. The steer-by-wire steering system of claim 7 wherein the feedback actuator is configured to provide a steering force to a vehicle driver when operating the steering shaft.

10. The steer-by-wire steering system of claim 7 wherein the gearing is configured as a pulley drive.

11. The steer-by-wire steering system of claim 7 wherein the gearing is configured as a toothed gearing.

12. The steer-by-wire steering system of claim 7 wherein at least one portion of the steering shaft is a solid shaft.

* * * * *